United States Patent
Lin et al.

(10) Patent No.: US 8,072,546 B2
(45) Date of Patent: Dec. 6, 2011

(54) METHOD AND APPARATUS FOR REDUCING CROSS-LUMINANCE IN AN IMAGE DISPLAY DEVICE

(75) Inventors: Teng-Yi Lin, Kaohsiung County (TW); Pao-Jen Chen, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1246 days.

(21) Appl. No.: 11/745,464

(22) Filed: May 8, 2007

(65) Prior Publication Data

US 2008/0122982 A1 May 29, 2008

(30) Foreign Application Priority Data

Nov. 29, 2006 (TW) ................ 95144120 A (51) Int. Cl.
*H04N 5/21* (2006.01)
*H04N 9/78* (2006.01)
(52) U.S. Cl. ........ 348/607; 348/609; 348/620; 348/666
(58) Field of Classification Search .......... 348/607, 348/609, 612, 624, 620, 663, 665, 666, 669, 348/670, 699–701, 708, 712, 713; *H04N 5/21, 9/77, 9/78, 9/64*
See application file for complete search history.

(56) References Cited

U.S. PATENT DOCUMENTS

| 5,519,452 | A | 5/1996 | Parulski | |
|---|---|---|---|---|
| 5,543,860 | A * | 8/1996 | Cho | ............... 348/666 |
| 5,870,153 | A | 2/1999 | Murray | |
| 2002/0167591 | A1 | 11/2002 | Kwon | |
| 2005/0162560 | A1 | 7/2005 | Movshovich | |
| 2006/0017854 | A1 | 1/2006 | Chao | |

FOREIGN PATENT DOCUMENTS

| EP | 0 759 253 | 2/1997 |
|---|---|---|
| WO | 95/31877 A2 | 11/1995 |

* cited by examiner

*Primary Examiner* — Sherrie Hsia
(74) *Attorney, Agent, or Firm* — Winston Hsu; Scott Margo (57) ABSTRACT

A method for reducing cross-luminance in an image display device includes receiving luminance signals of a plurality of frames in a composite video signal, determining a movement condition of a first frame of the plurality of frames according to the luminance signals, performing a filtering operation for the first frame according to the movement condition of the first frame, and outputting a result of the filtering operation.

32 Claims, 8 Drawing Sheets

METHOD AND APPARATUS FOR REDUCING CROSS-LUMINANCE IN AN IMAGE DISPLAY DEVICE

BACKGROUND OF THE INVENTION

1. Field of the Invention

The present invention relates to a method and related apparatus for reducing cross-luminance in an image display device, and more particularly, to a method and related apparatus capable of selecting an appropriate filtering operation according as the image movement condition is in a motion state or a static state for eliminating cross-luminance artifact.

2. Description of the Prior Art

With technological advances in display technology, video processing, and integrated circuit fabrication, in tandem with the rapid development of wireless networking, users can view their favorite movies and television programs on a video display device (such as a television) any time, any place. Thus, information and entertainment become increasingly accessible, and user requirements for picture quality increase in like manner.

The human eye has four different types of light receptor, of which three are used for distinguishing light of different wavelength (the fourth is only used under dim lighting conditions, and cannot discern colors). In other words, all light visible to the human eye can be fully described by three axes. Thus, when displaying a picture, only red, blue, and green (RGB) light information output is needed, when speaking in terms of the human eye, to show an image of realistic quality. However, to reduce bandwidth and ensure compatibility, the prior art color television broadcast system does not directly output RGB signals, but instead outputs a composite signal. The "composite" signal is an output signal that is a mix of a luminance signal and a chrominance signal, which is compatible with black-and-white and color television systems, and also conserves bandwidth.

The earliest television was the black-and-white television. Later, when color television systems were being developed, to promote compatibility between black-and-white television signals and color television signals, black-and-white (luminance) signals and color (chrominance) signals were separated. In this way, a black-and-white television needed only to decode the incoming luminance signal from a television station in order to display a picture. Color televisions would decode both the luminance signal and the chrominance signal together in order to display a color picture. Because the human eye is more sensitive to luminance than chrominance, or in other words, the human eye requires less color resolution than black-and-white resolution, the color signal does not require as much bandwidth as the black-and-white signal. Thus, by taking advantage of the human eye's relative insensitivity to color, transmission bandwidth can be reduced and used in black-and-white and color televisions.

Taking the National Television Standards Committee (NTSC) standard as an example, NTSC originally used a YIQ color space. The YIQ color space uses quadrature modulation to synthesize a common spectrum intermodulation signal I with a quadrature signal Q to form a single chrominance signal C. The chrominance signal C is then added to a luminance signal Y, and with an accompanying horizontal and vertical synchronization pulse, a blanking pulse, and a color burst, the composite signal is generated. The NTSC standard adopts a 6 MHz channel bandwidth, with 4.2 MHz reserved for the luminance signal Y, 1.6 MHz given to the intermodulation signal I, and 0.6 MHz appropriated to the quadrature signal Q. In contrast to the NTSC standard signal, the Phase Alternating Line (PAL) standard adopts a YUV color space. To increase picture quality, a color phase of the chrominance signal is alternately set as positive and negative for each successive scanline. The PAL standard uses an 8 MHz channel, allocating 5.5 MHz to the luminance signal Y and 1.8 MHz to a signal U and a signal V.

Thus, by splitting the luminance signal and the chrominance signal, then transmitting the signals together, the transmission bandwidth can be reduced, and the transmitted signal can be used in both black-and-white and color televisions. Correspondingly, a receiving end need only comprise a circuit such as a comb filter, for isolating the luminance signal Y and the chrominance signal C, in order to play both black-and-white and color television. However, the composite Y/C signal has one large problem, which primarily lies in the fact that high-frequency components of the luminance signal Y overlap with the frequency spectrum of the chrominance signal C. This makes it difficult for the receiving end to accurately and completely separate the luminance signal Y and the chrominance signal C in their original forms from the composite signal Y/C. Ultimately, this inability to separate the luminance signal Y from the chrominance signal C results in flaws in the picture. For example, if the luminance signal Y is processed as part of the chrominance signal C, a cross-color artifact is produced, and the picture will exhibit a rainbow effect. Likewise, if the chrominance signal C is processed as part of the luminance signal Y, a cross-luminance artifact is produced, resulting in a horizontal or vertical dotted line in a static picture, and a meshed image in a motion picture.

In a prior art image display device, the Y/C separation circuit usually utilizes a three-dimensional filter for filtering signals. However, the three-dimensional filter can reduce the cross-luminance artifact in the static picture, but cannot eliminate the meshed image in the motion picture, so that the image quality of the motion picture cannot be enhanced effectively.

SUMMARY OF THE INVENTION

It is therefore a primary objective of the present invention to provide a method and related apparatus for reducing cross-luminance in an image display device.

The present invention discloses a method for eliminating cross-luminance in an image display device. The method comprises receiving luminance signals of a plurality of frames in a composite video signal, determining an image movement condition of a first frame of the plurality of frames according to the luminance signals of the plurality of frames, performing a filtering operation for luminance signals of the first frame according to the image movement condition of the first frame, and outputting a result of the filtering operation.

The present invention further discloses a cross-luminance elimination device for an image display device. The cross-luminance elimination device comprises a reception end for receiving luminance signals of a plurality of frames in a composite video signal, a movement detection unit coupled to the reception end for determining an image movement condition of a first frame of the plurality of frames according to the luminance signals of the plurality of frames, a filtering unit coupled to the reception end and the movement detection unit for performing a filtering operation for luminance signals of the first frame according to the image movement condition of the first frame, and an output end coupled to the filtering unit for outputting a filtering result of the filtering unit.

The present invention further discloses an image display device capable of eliminating cross-luminance. The image display device comprises a composite video signal reception end for receiving a composite video signal, a luminance and chrominance signal separation module coupled to the composite video signal reception end for acquiring luminance signals and chrominance signals of a plurality of frames in the composite video signal with a three-dimensional filter, a chrominance signal demodulation module coupled to the luminance and chrominance signal separation module for performing a demodulation operation for the chrominance signals of the plurality of frames, a cross-luminance elimination module, and an output module coupled to the chrominance signal demodulation module and the output end of the cross-luminance reduction module for outputting the plurality of frames according to output signals of the chrominance signal demodulation module and the cross-luminance reduction module. The cross-luminance elimination module comprises a reception end coupled to the luminance and chrominance signal separation module for receiving the luminance signals of the plurality of frames, a movement detection unit coupled to the reception end for determining image movement conditions of the plurality of frames according to the luminance signals of the plurality of frames, a filtering unit coupled to the reception end and the movement detection unit for performing filtering operations for the luminance signals of the plurality of frames according to the image movement conditions of the plurality of frames, and an output end coupled to the filtering unit for outputting filtering results of the filtering unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
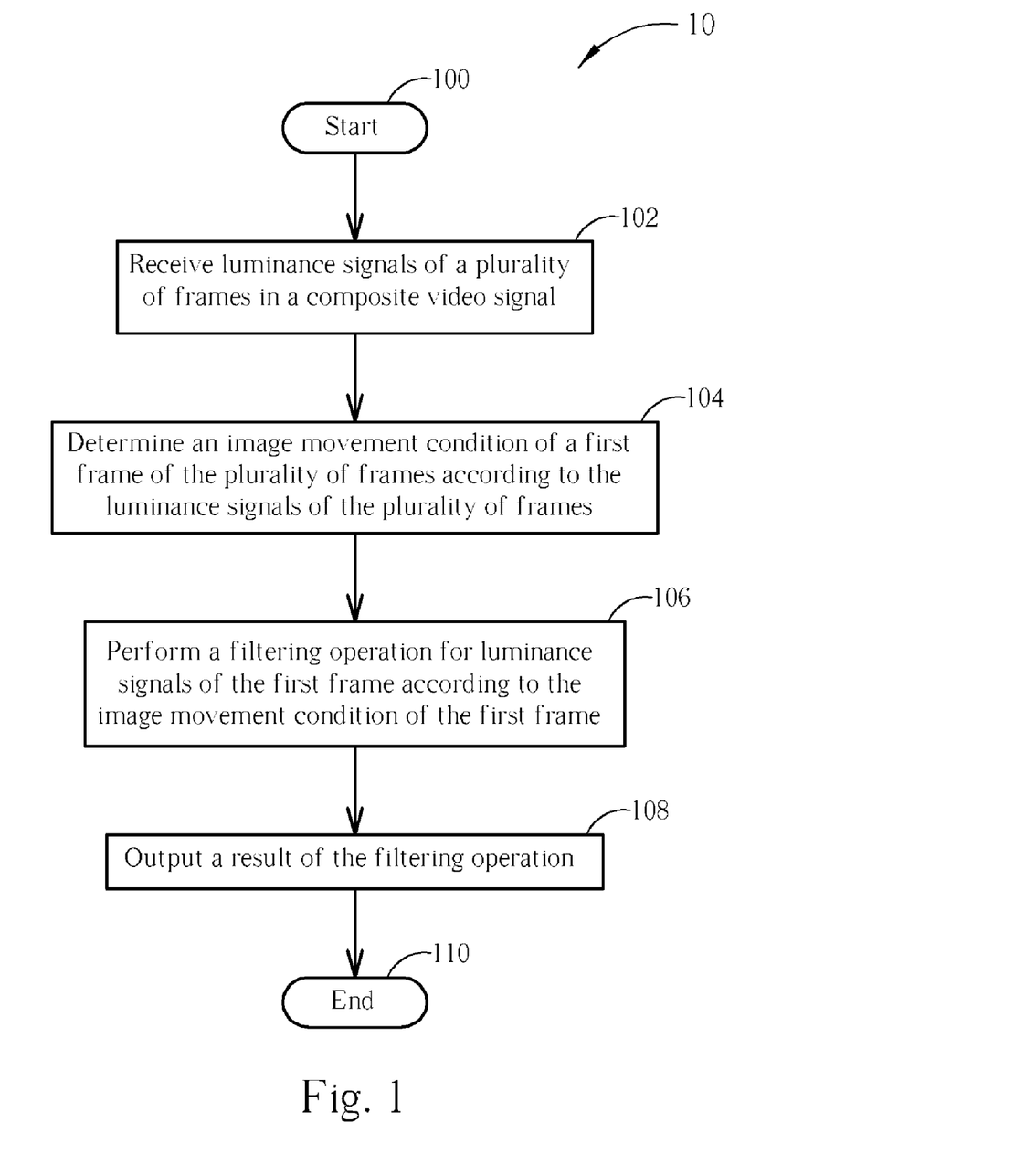
FIG. 1 is a schematic diagram of a process according to an embodiment of the present invention.

Please refer to FIG. 1. FIG. 1 is a schematic diagram of a process 10 according to an embodiment of the present invention. The process 10 is utilized for eliminating the cross-luminance artifact in an image display device, and comprises the following steps:

Step 100: start.

Step 102: receive luminance signals of a plurality of frames in a composite video signal.

Step 104: determine an image movement condition of a first frame of the plurality of frames according to the luminance signals of the plurality of frames.

Step 106: perform a filtering operation for luminance signals of the first frame according to the image movement condition of the first frame.

Step 108: output a result of the filtering operation.

Step 110: end.

Therefore, the process 10 determines an image movement condition of the first frame according to the luminance signals of the plurality of frames in a composite video signal, and performs a corresponding filtering operation for the luminance signals of the first frame. In other words, according to the image movement condition, the present invention can perform different filtering operations for the luminance signals. Since the effect of the cross-luminance artifact depends on whether the image is in motion or static, the present invention can perform a corresponding filtering operation for the luminance signals of the frames in the composite video signal according to the image movement condition, so as to eliminate the cross-luminance artifact.

Preferably, the present invention can determine the image movement condition of the first frame according to a difference between the luminance signals of the first frame and a second frame, wherein the second frame can be the former one frame of the first frame or the frame separated by one frame with the first frame. When the image movement condition of the first frame is approximate to a static state, the present invention performs a three-dimensional filtering operation for the luminance signals of the first frame. When the image movement condition of the first frame is approximate to a motion state, the present invention performs a three-dimensional filtering operation and a two-dimensional filtering operation for the luminance signals of the first frame. When the image movement condition of the first frame is between a motion state and a static state, the present invention performs a three-dimensional filtering operation for the luminance signals of the first frame, a two-dimensional filtering operation for a result of the three-dimensional filtering operation, and mixes the results of the three-dimensional filtering operation and the two-dimensional filtering operation. Note that, the two-dimensional filtering operation can comprise a low-pass two-dimensional filtering operation and a high-pass two-dimensional filtering operation, and the plurality of frames conforms to an NTSC broadcast television standard.

As mentioned above, the high-frequency components of the luminance signal Y overlap with the frequency spectrum of the chrominance signal C in the composite video signal. Thus, it is difficult for a receiving end to accurately and completely separate the luminance signal Y and the chrominance signal C into their original forms from the composite video signal. With inaccurate separations of the luminance signal Y and the chrominance signal C, there exists flaws in the picture. When the chrominance signal C is processed as part of the luminance signal Y, the cross-luminance artifact is produced, resulting in a horizontal or vertical dotted line in the static picture but a meshed image in the motion picture. Therefore, the process 10 performs the three-dimensional filtering operation for the luminance signal of the static picture, performs the three-dimensional filtering operation and the two-dimensional filtering operation for the luminance signal of the motion picture, and performs the three-dimensional filtering operation and the two-dimensional filtering operation for the result of the three-dimensional filtering operation, and mixes the results of the three-dimensional filtering operation and the two-dimensional filtering operation for the picture between the motion state and the static state. Therefore, regardless of motion or static pictures, the present invention can eliminate the cross-luminance artifact for enhancing the image quality of the display device. In comparison, the prior art only performs the same filtering operation for the luminance signal of the image frame, so that the image quality cannot be enhanced. Therefore, the present invention can improve disadvantages of the prior art.

Figure 2:
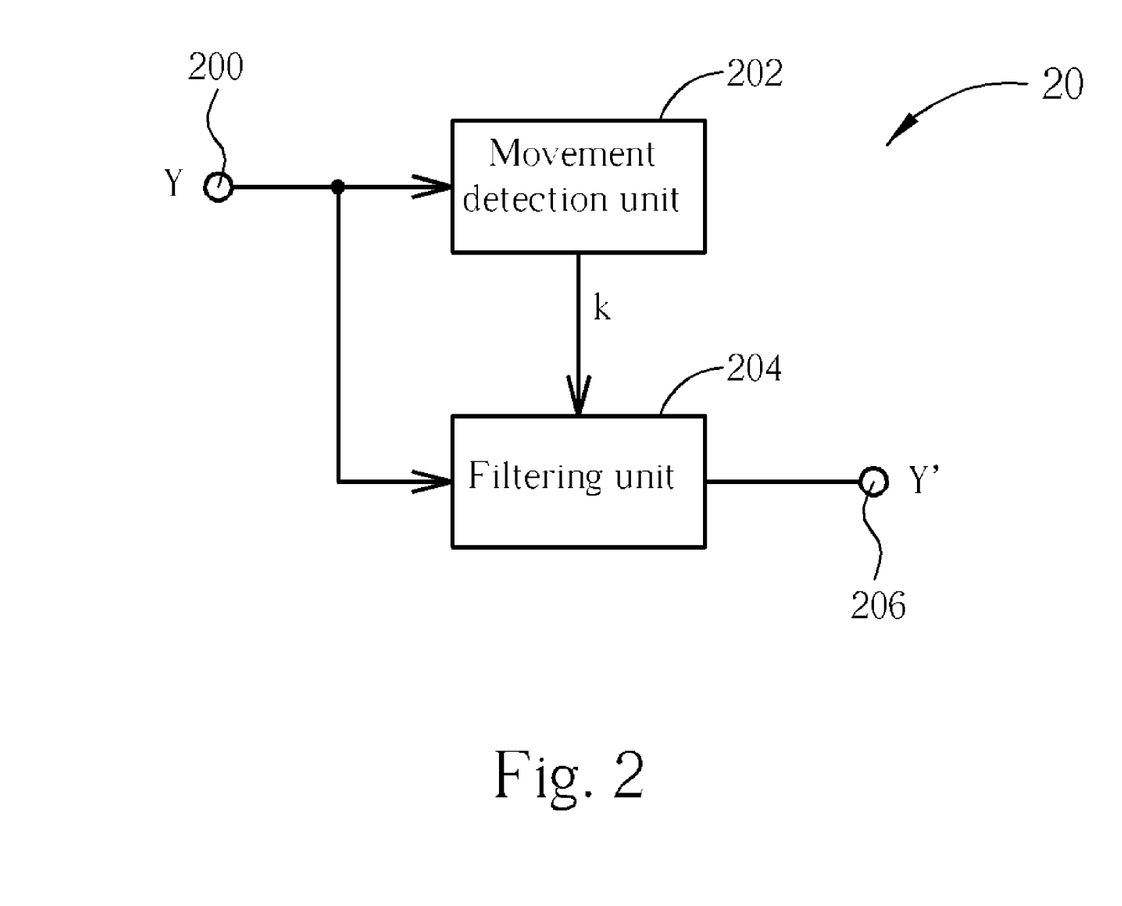
FIG. 2 is a schematic diagram of a cross-luminance elimination device for an image display device according to an embodiment of the present invention.

Please refer to FIG. 2. FIG. 2 is a schematic diagram of a cross-luminance elimination device 20 for an image display device according to an embodiment of the present invention. The cross-luminance elimination device 20 is utilized for realizing the process 10, and comprises a reception end 200, a movement detection unit 202, a filtering unit 204, and an output end 206. The reception end 200 is utilized for receiving luminance signals Y of a plurality of frames in a composite video signal. According to the luminance signals received by the reception end 200, the movement detection unit 202 can determine the image movement condition of the plurality of frames, and output a decision result k to the filtering unit 204. The filtering unit 204 can perform filtering operations for the luminance signals received by the reception end 200 according to the decision result k outputted by the movement detection unit 202, and output the filtering result Y' of the luminance signal Y through the output end 206.

Figure 3:
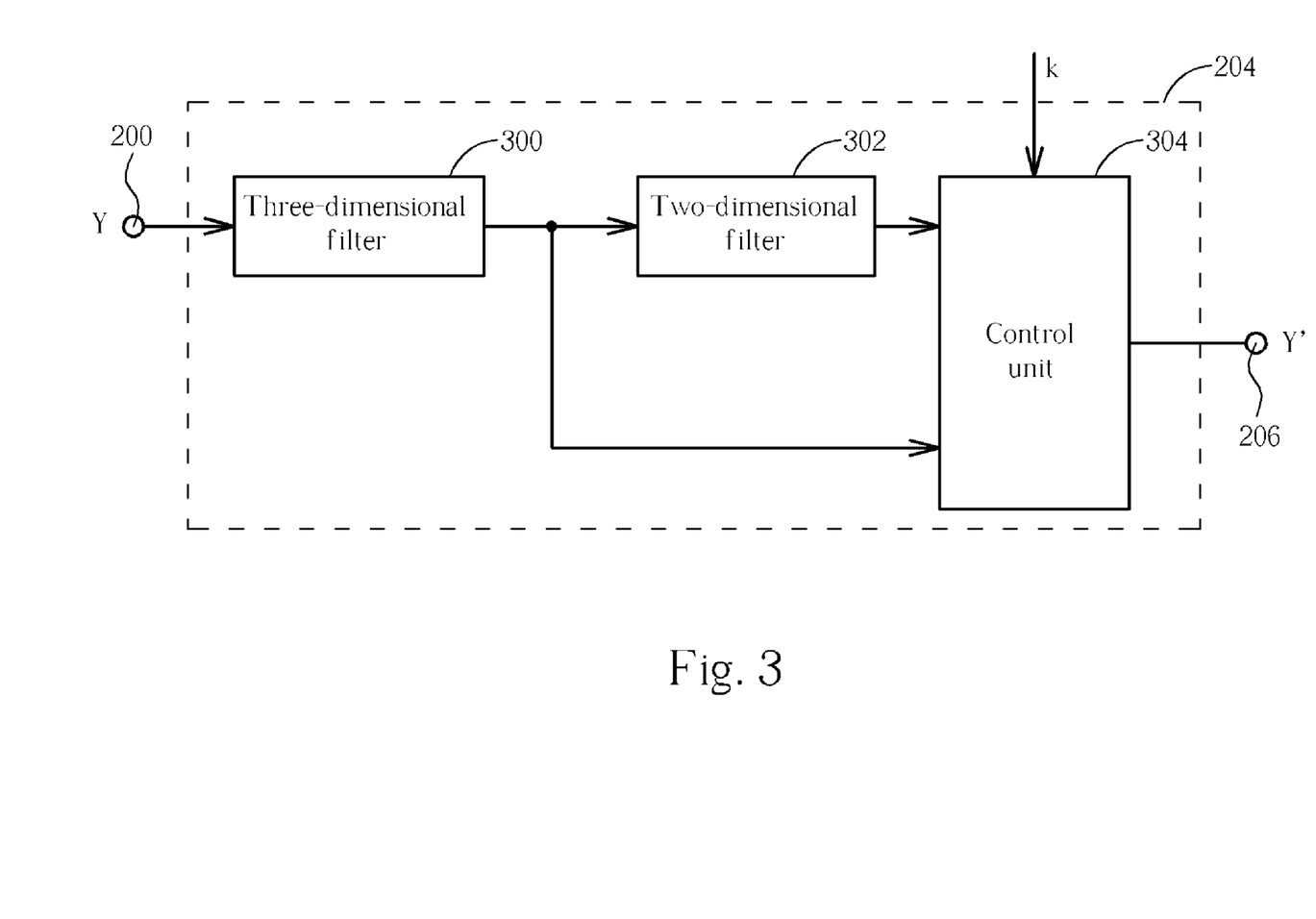
FIG. 3 is a schematic diagram of a filtering unit in FIG. 2.

Please refer to FIG. 3. FIG. 3 is a schematic diagram of the filtering unit 204 in FIG. 2. The filtering unit 204 comprises a three-dimensional filter 300, a two-dimensional filter 302, and a control unit 304. The three-dimensional filter 300 is utilized for performing three-dimensional filtering operations for the luminance signals received by the reception end 200, and the two-dimensional filter 302 is utilized for performing two-dimensional filtering operations for the results outputted by the three-dimensional filter 300. The control unit 304 is utilized for outputting the filtering result of the three-dimensional filter 300 or the two-dimensional filter 302 according to the decision result k outputted by the movement detection unit 202. When the image movement condition of the image frame is approximate to a static state, the control unit 304 outputs the filtering result of the three-dimensional filter 300. When the image movement condition of the image frame is approximate to a motion state, the control unit 304 outputs a filtering result of the two-dimensional filter 302. When the image movement condition of the image frame is between the motion state and the static state, the control unit 304 mixes the filtering results of the three-dimensional filter 300 and the two-dimensional filter 302.

Figure 4:
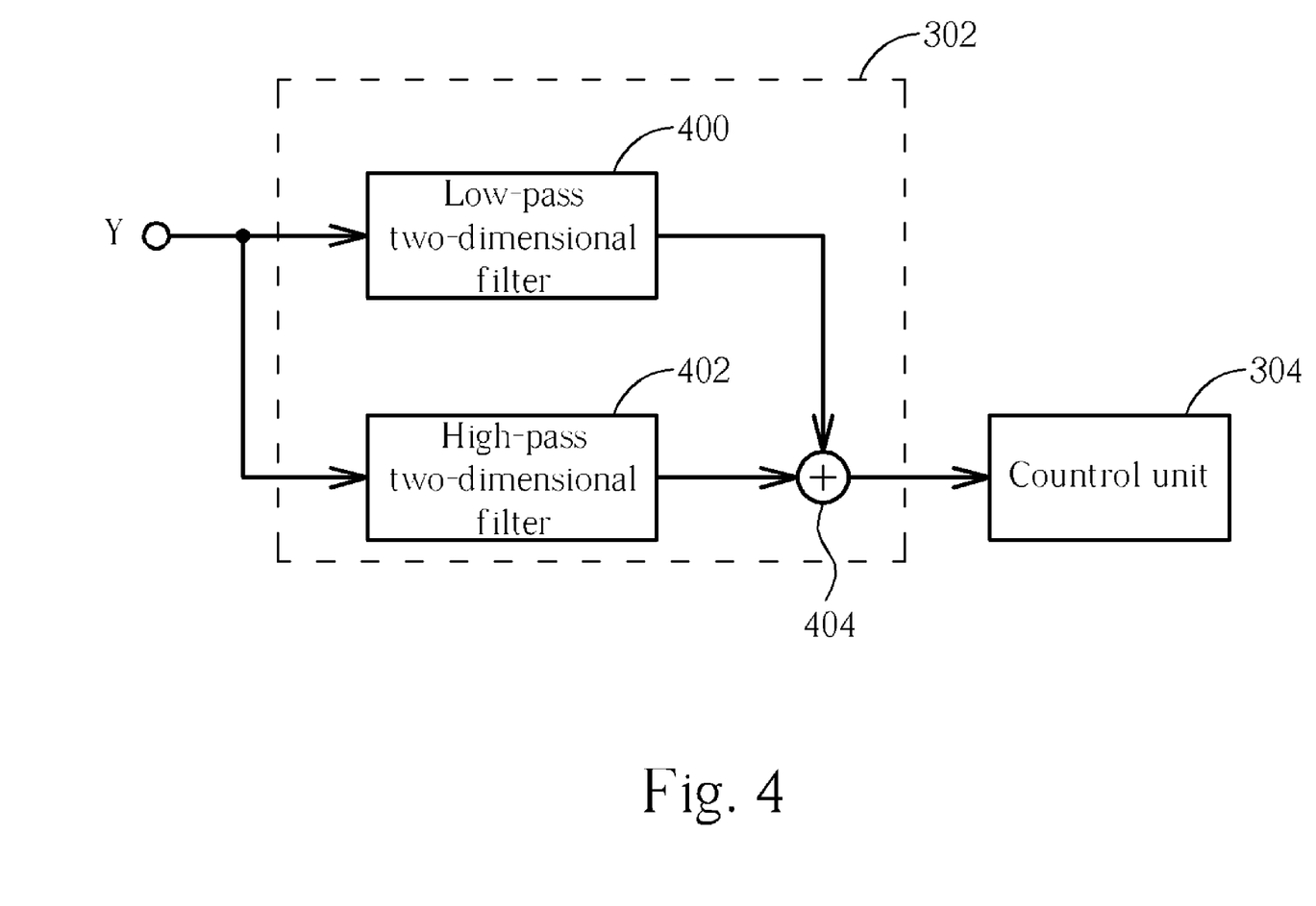
FIG. 4 is a schematic diagram of a two-dimensional filter in FIG. 3.

Please refer to FIG. 4. FIG. 4 is a schematic diagram of the two-dimensional filter 302 in FIG. 3. The two-dimensional filter 302 comprises a low-pass two-dimensional filter 400, a high-pass two-dimensional filter 402, and an adder 404. The low-pass two-dimensional filter 400 can filter the cross-luminance artifact. The high-pass two-dimensional filter 402 can increase sharpness of signals. The adder 404 can accumulate filtering results of the low-pass two-dimensional filter 400 and the high-pass two-dimensional filter 402.

Therefore, in the cross-luminance elimination device 20, the movement detection unit 202 can determine the image movement condition of the image frame according to the luminance signals received by the reception end 200. When the image movement condition is in the static state, the control unit 304 of the filtering unit 204 outputs the filtering result of the three-dimensional filter 300. When the image movement condition is in the motion state, the control unit 304 of the filtering unit 204 outputs the filtering result of the two-dimensional filter 302 for filtering the cross-luminance with the low-pass two-dimensional filter 400 and increasing the sharpness of signals with the high-pass two-dimensional filter 402. When the image movement condition is between the motion state and the static state, the control unit 304 of the filtering unit 204 mixes the filtering results of the three-dimensional filter 300 and the two-dimensional filter 302. Therefore, regardless of motion or static pictures, the present invention can eliminate the cross-luminance artifact, so as to enhance the image quality of the display device.

Figure 5:
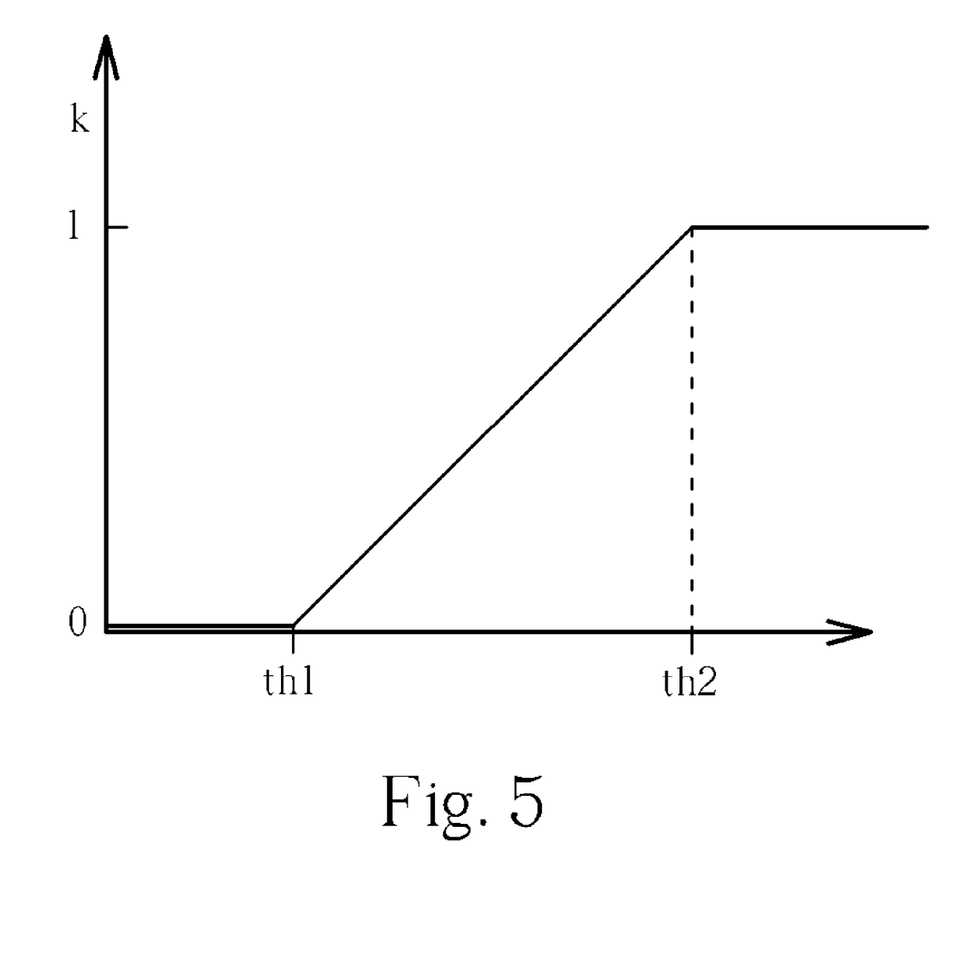
FIG. 5 is a schematic diagram of decision results outputted by a movement detection unit in FIG. 2.
Figure 8:
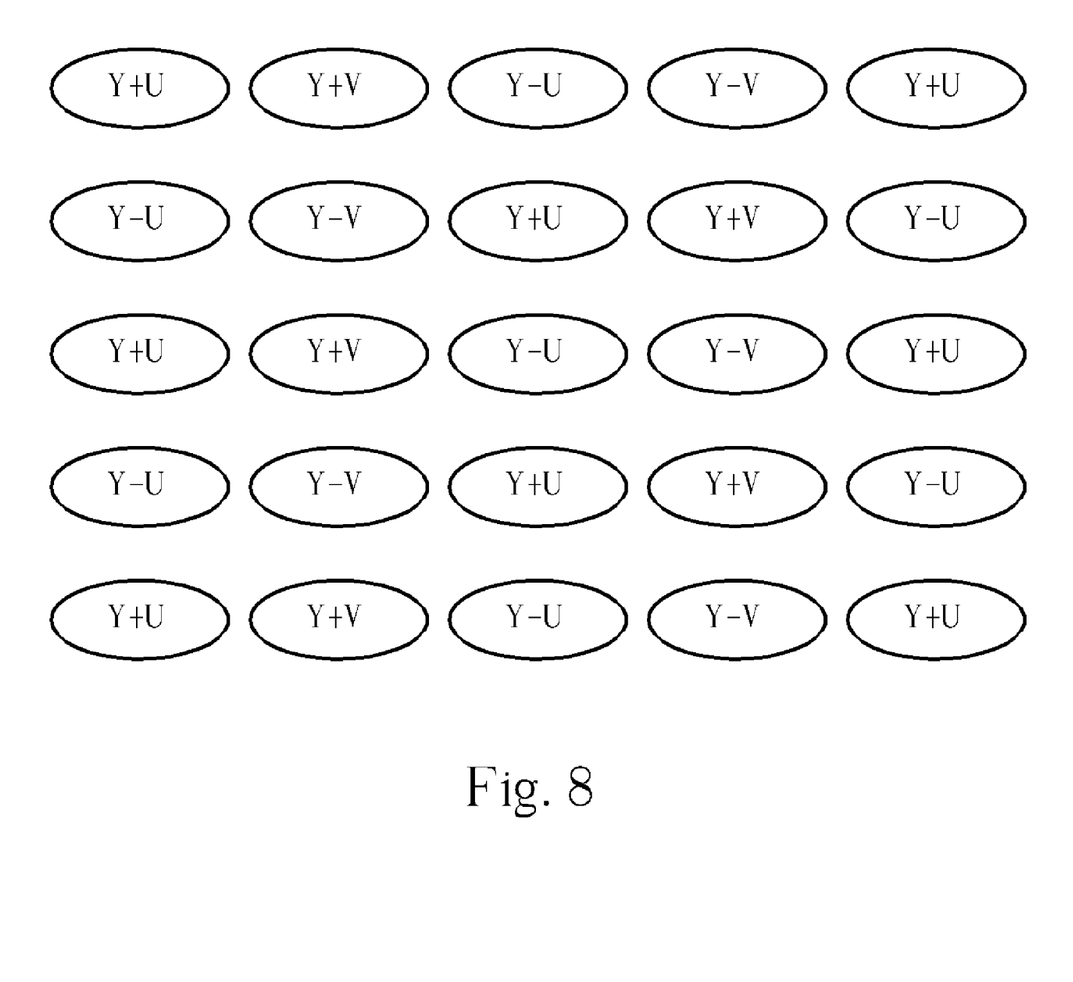
FIG. 8 is a schematic diagram of the luminance signal and the chrominance signal in an NTSC frame.

Note that, FIG. 2 to FIG. 4 are schematic diagrams of the embodiments according to the present invention, and those skilled in the art can make modifications to realize the process 10. For example, the movement detection unit 202 can determine the image movement condition of the image frame according to differences of the luminance signals between two adjacent frames, or by comparing the luminance signals of the two frames that are separated by a frame. Furthermore, as shown in FIG. 5, the decision result k outputted by the movement detection unit 202 can be in like manner: when the image movement condition is smaller than a threshold value th1, the image of the frame is determined as static (k=0); when the image movement condition is greater than a threshold value th2, the image of the frame is determined as in motion (k=1); and when the image movement condition is between the threshold values th1 and th2, the decision result k can be outputted linearly. Therefore, the control unit 304 can set weightings for the filtering results of the three-dimensional filter 300 and the two-dimensional filter 302 according to the decision result k. On the other hand, for an NTSC image frame, combination of the luminance signal Y and the chrominance signal U and V are shown in FIG. 8. Hence, in order to acquire the luminance signal Y, the low-pass two-dimensional filter 400 can be designed as $$\begin{bmatrix} 0 & 0 & 1 & 0 & 0 \\ 1 & 0 & 4 & 0 & 1 \\ 0 & 0 & 1 & 0 & 0 \end{bmatrix},$$

while the high-pass two-dimensional filter 402 can be designed as $$\begin{bmatrix} -1 & 0 & 0 & 0 & -1 \\ 0 & 0 & 4 & 0 & 0 \\ -1 & 0 & 0 & 0 & -1 \end{bmatrix},$$

so that the chrominance signal U or V can be filtered.

Figure 6:
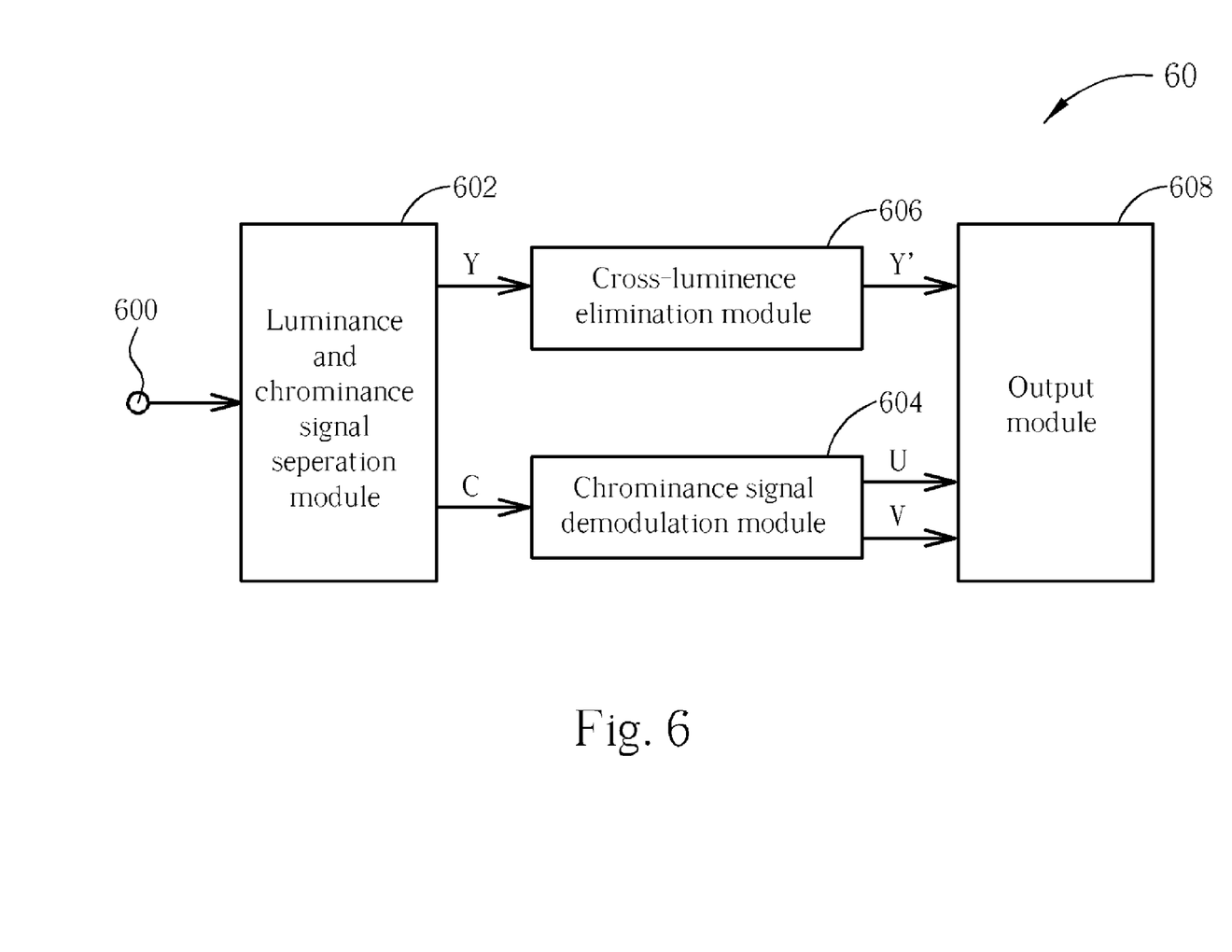
FIG. 6 is a schematic diagram of an image display device according to an embodiment of the present invention.

Please refer to FIG. 6. FIG. 6 is a schematic diagram of an image display device 60 according to an embodiment of the present invention. The image display device 60 comprises a composite video signal reception end 600, a luminance and chrominance signal separation module 602, a chrominance signal demodulation module 604, a cross-luminance elimination module 606, and an output module 608. The luminance and chrominance signal separation module 602 can receive composite video signals from the composite video signal reception end 600, and separate luminance signals and chrominance signals of the composite video signals with a built-in three-dimensional filter for the cross-luminance elimination module 606 and the chrominance signal demodulation module 604 respectively, so as to eliminate the cross-luminance and perform demodulation operations for the chrominance signals. At last, the output module 608 outputs image frames according to the signals outputted by the chrominance signal demodulation module 604 and the cross-luminance elimination module 606.

Figure 7:
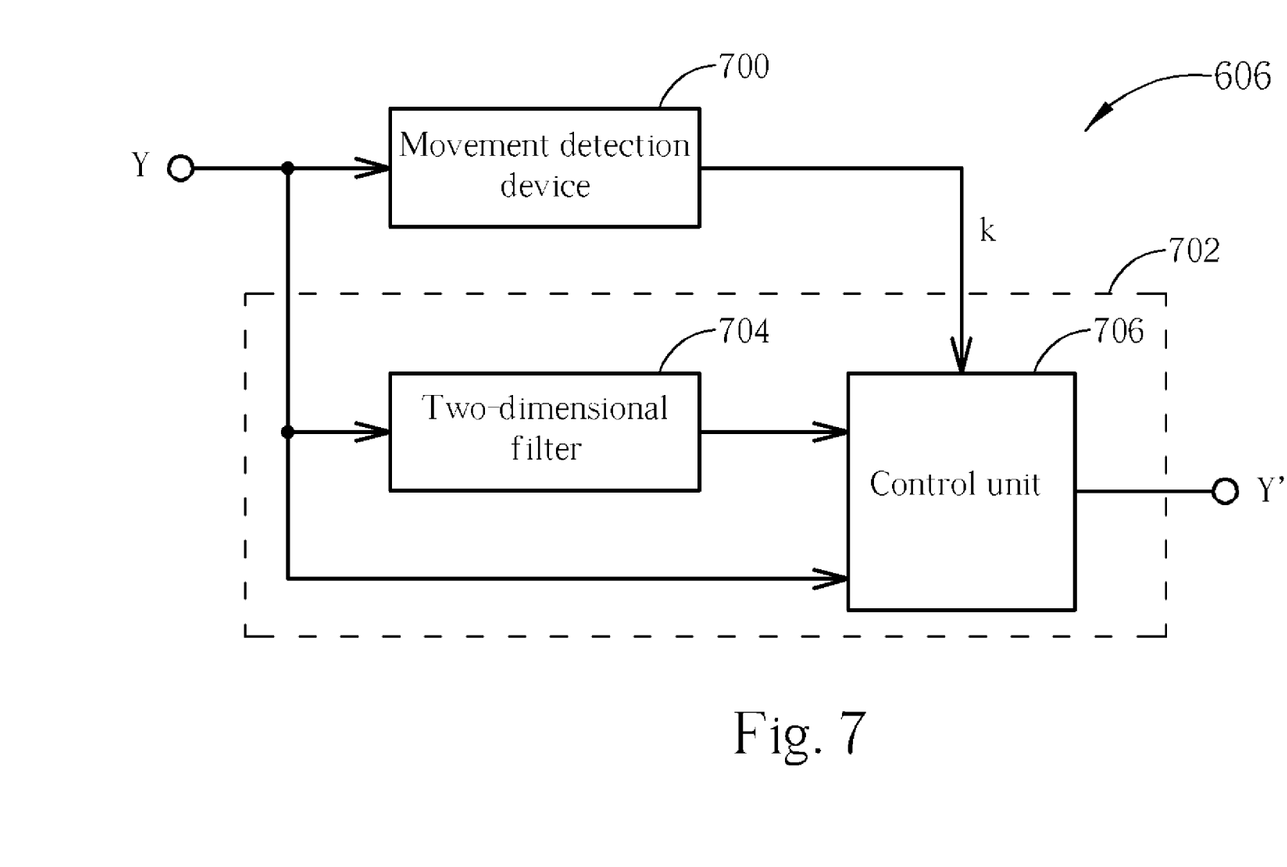
FIG. 7 is a schematic diagram of a cross-luminance elimination module in FIG. 6.

Please further refer to FIG. 7. FIG. 7 is a schematic diagram of the cross-luminance elimination module 606 in FIG. 6. The structure and related operation of the cross-luminance elimination module 606 are similar to that of the cross-luminance elimination device 20 shown in FIG. 2. The cross-luminance elimination module 606 also comprises a movement detection unit 700 and a filtering unit 702. Since signals inputted to the luminance and chrominance signal separation module 602 are already performed with the three-dimensional filtering operation, the three-dimensional filter of the cross-luminance elimination module 606 can be saved. Therefore, as shown in FIG. 7, the filtering unit 702 comprises a two-dimensional filter 704 and a control unit 706. The structure of the two-dimensional filter 704 is the same with the two-dimensional filter 302, which can also consist of a low-pass two-dimensional filter and a high-pass two-dimensional filter. The operation of the control unit 706 is similar to that of the control unit 304, and utilized for outputting the luminance signals Y outputted by the luminance and chrominance signal separation module 602 or the filtering result of the two-dimensional filter 704 according to the decision result k of the movement detection unit 700. When the image movement condition is approximate to the static state, the control unit 706 outputs the luminance signal Y outputted by the luminance and chrominance signal separation module 602. When the image movement condition is approximate to the motion state, the control unit 706 outputs the filtering result of the two-dimensional filter 704. When the image movement condition is between the motion state and the static state, the control unit 706 mixes the luminance signal Y outputted by the luminance and chrominance signal separation module 602 and the filtering result of the two-dimensional filter 704. Therefore, with the cross-luminance elimination module 606, the image display device can eliminate the cross-luminance artifact, so as to improve the image quality.

As mentioned above, the present invention determines the image movement condition according to the luminance signals in the composite video signal, and performs the corresponding filtering operation for the luminance signals. When the image movement condition of the frame is approximate to the static state, the luminance signals are performed with the three-dimensional filtering operation. When the image movement condition of the frame is approximate to the motion state, the luminance signals are performed with the three-dimensional filtering operation and the two-dimensional filtering operation. When the image movement condition is between the motion state and the static state, the present invention performs the three-dimensional filtering operation for the luminance signals and the two-dimensional filtering operation for the result of the three-dimensional filtering operation, and mixes the filtering results of the three-dimensional filtering operation and the two-dimensional filtering operation. Therefore, the present invention can select the appropriate filtering operation for eliminating the cross-luminance according to the image movement condition is in the motion state or in the static state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for eliminating cross-luminance in an image display device comprising:
receiving luminance signals of a plurality of frames in a composite video signal;
determining an image movement condition of a first frame of the plurality of frames according to the luminance signals of the plurality of frames;
performing at least one filtering operation of a three-dimensional filtering operation and a two-dimensional filtering operation for luminance signals of the first frame according to the image movement condition of the first frame; and
outputting a result of the filtering operation.

2. The method of claim 1, wherein determining the image movement condition of the first frame of the plurality of frames according to the luminance signals of the plurality of frames is determining the image movement condition of the first frame according to a difference between luminance signals of the first frame and a second frame.

3. The method of claim 2, wherein the second frame is a last frame prior to the first frame.

4. The method of claim 2, wherein the second frame and the first frame are separated by a frame.

5. The method of claim 1, wherein performing the filtering operation for the luminance signals of the first frame according to the image movement condition of the first frame is performing the three-dimensional filtering operation for the luminance signals of the first frame when the image movement condition of the first frame is approximate to a static state.

6. The method of claim 1, wherein performing the filtering operation for the luminance signals of the first frame according to the image movement condition of the first frame is performing the three-dimensional filtering operation and the two-dimensional filtering operation for the luminance signals of the first frame when the image movement condition of the first frame is approximate to a motion state.

7. The method of claim 6, wherein performing the two-dimensional filtering operation for the first frame comprises performing a low-pass two-dimensional filtering operation for the first frame.

8. The method of claim 6, wherein performing the two-dimensional filtering operation for the first frame further comprises performing a high-pass two-dimensional filtering operation for the first frame.

9. The method of claim 1, wherein performing the filtering operation for luminance signals of the first frame according to the image movement condition of the first frame is performing the three-dimensional filtering operation for the luminance signals of the first frame, performing the two-dimensional filtering operation for a result of the three-dimensional filtering operation when the image movement condition of the first frame is between a motion state and a static state, and mixing the result of the three-dimensional filtering operation and that of two-dimensional filtering operation.

10. The method of claim 9, wherein performing the two-dimensional filtering operation for the result of the three-dimensional filtering operation comprises performing a low-pass two-dimensional filtering operation for the two-dimensional filtering operation.

11. The method of claim 9, wherein performing the two-dimensional filtering operation for the result of the three-dimensional filtering operation comprises performing a high-pass two-dimensional filtering operation for the two-dimensional filtering operation.

12. The method of claim 1, wherein the plurality of frames conforms to an NTSC (National Television Committee) broadcast television standard.

13. A cross-luminance elimination device for an image display device comprising:
a reception end for receiving luminance signals of a plurality of frames in a composite video signal;
a movement detection unit coupled to the reception end for determining an image movement condition of a first frame of the plurality of frames according to the luminance signals of the plurality of frames;

a filtering unit coupled to the reception end and the movement detection unit for performing at least one filtering operation of a three-dimensional filtering operation and a two-dimensional filtering operation for luminance signals of the first frame according to the image movement condition of the first frame; and an output end coupled to the filtering unit for outputting a filtering result of the filtering unit.

14. The cross-luminance elimination device of claim 13, wherein the movement detection unit determines the image movement condition of the first frame according to a difference between luminance signals of the first frame and a second frame.

15. The cross-luminance elimination device of claim 14, wherein the second frame is a last frame prior to the first frame.

16. The cross-luminance elimination device of claim 14, wherein the second frame and the first frame are separated by a frame.

17. The cross-luminance elimination device of claim 13, wherein the filtering unit comprises:

the three-dimensional filter coupled to the reception end;

the two-dimensional filter coupled to an output end of the three-dimensional filter; and a control unit coupled to an output end of the two-dimensional filter, the output end of the three-dimensional filter, and the movement detection unit for outputting a filtering result of the three-dimensional filter when the image movement condition of the first frame is approximate to a static state, outputting a filtering result of the two-dimensional filter when the image movement condition of the first frame is approximate to a motion state, and mixing the filtering results of the three-dimensional filter and the two-dimensional filter when the image movement condition of the first frame is between the motion state and the static state.

18. The cross-luminance elimination device of claim 17, wherein the two-dimensional filter comprises a low-pass two-dimensional filter coupled to the output end of the three-dimensional filter.

19. The cross-luminance elimination device of claim 18, wherein the low-pass two-dimensional filter is $$\begin{bmatrix} 0 & 0 & 1 & 0 & 0 \\ 1 & 0 & 4 & 0 & 1 \\ 0 & 0 & 1 & 0 & 0 \end{bmatrix}.$$

20. The cross-luminance reduction device of claim 18, wherein the two-dimensional filter further comprises:

a high-pass two-dimensional filter coupled to the output end of the three-dimensional filter; and an adder coupled to the high-pass two-dimensional filter, the low-pass two-dimensional filter, and the control unit for accumulating the filtering results of the high-pass two-dimensional filter and the low-pass two-dimensional filter and outputting an accumulation result to the control result.

21. The cross-luminance elimination device of claim 20, wherein the high-pass two-dimensional filter is $$\begin{bmatrix} -1 & 0 & 0 & 0 & -1 \\ 0 & 0 & 4 & 0 & 0 \\ -1 & 0 & 0 & 0 & -1 \end{bmatrix}.$$

22. The cross-luminance elimination device of claim 13, wherein the plurality of frames conforms to an NTSC (National Television Committee) broadcast television standard.

23. An image display device capable of eliminating cross-luminance comprising:

a composite video signal reception end for receiving a composite video signal;

a luminance and chrominance signal separation module coupled to the composite video signal reception end for acquiring luminance signals and chrominance signals of a plurality of frames in the composite video signal with a three-dimensional filter;

a chrominance signal demodulation module coupled to the luminance and chrominance signal separation module for performing a demodulation operation for the chrominance signals of the plurality of frames;

a cross-luminance elimination module comprising:

a reception end coupled to the luminance and chrominance signal separation module for receiving the luminance signals of the plurality of frames;

a movement detection unit coupled to the reception end for determining image movement conditions of the plurality of frames according to the luminance signals of the plurality of frames;

a filtering unit coupled to the reception end and the movement detection unit for performing filtering operations for the luminance signals of the plurality of frames according to the image movement conditions of the plurality of frames; and an output end coupled to the filtering unit for outputting filtering results of the filtering unit; and an output module coupled to the chrominance signal demodulation module and the output end of the cross-luminance reduction module for outputting the plurality of frames according to output signals of the chrominance signal demodulation module and the cross-luminance reduction module.

24. The image display device of claim 23, wherein the movement detection unit determines an image movement condition of a first frame according to a difference between luminance signals of the first frame and a second frame.

25. The image display device of claim 24, wherein the second frame is a last frame prior to the first frame.

26. The image display device of claim 24, wherein the second frame and the first frame are separated by a frame.

27. The image display device of claim 23, wherein the filtering unit comprises:

a two-dimensional filter coupled to the reception end; and a control unit coupled to an output end of the two-dimensional filter and the reception end for outputting signals of the reception end when the image movement conditions of the plurality of frames are approximate to a static state, outputting filtering results of the two-dimensional filter when the image movement conditions of the plurality of frames are approximate to a motion state, and mixing the signals of the reception end and the filtering results of the two-dimensional filter when the image movement conditions of the plurality of frames are between the motion state and the static state.

28. The image display device of claim 27, wherein the two-dimensional filter comprises a low-pass two-dimensional filter coupled to the reception end.

29. The image display device of claim 28, wherein the low-pass two-dimensional filter is $$\begin{bmatrix} 0 & 0 & 1 & 0 & 0 \\ 1 & 0 & 4 & 0 & 1 \\ 0 & 0 & 1 & 0 & 0 \end{bmatrix}.$$

30. The image display device of claim 28, wherein the two-dimensional filter further comprises:
 a high-pass two-dimensional filter coupled to the reception end; and
 an adder coupled to the high-pass two-dimensional filter, the low-pass two-dimensional filter, and the control unit for accumulating the filtering results of the high-pass two-dimensional filter and the low-pass two-dimensional filter, and outputting an accumulation result to the control result.

31. The image display device of claim 30, wherein the high-pass two-dimensional filter is $$\begin{bmatrix} -1 & 0 & 0 & 0 & -1 \\ 0 & 0 & 4 & 0 & 0 \\ -1 & 0 & 0 & 0 & -1 \end{bmatrix}.$$

32. The image display device of claim 23, wherein the plurality of frames conforms to an NTSC (National Television Committee) broadcast television standard.

* * * * *